US011619490B2

(12) United States Patent
Li et al.

(10) Patent No.: US 11,619,490 B2
(45) Date of Patent: Apr. 4, 2023

(54) MEASURING DEVICE FOR WAVE ENERGY CONVERSION PERFORMANCE OF COMB-TYPED PERMEABLE BREAKWATER WITH ARCUATE WALLS

(71) Applicant: LUDONG UNIVERSITY, Yantai (CN)

(72) Inventors: Xueyan Li, Yantai (CN); Qing Wang, Shanghai (CN); Fang Hou, Heze (CN); Jing Peng, Wuwei (CN); Yanxin Ding, Yantai (CN)

(73) Assignee: LUDONG UNIVERSITY, Yantai (CN)

( * ) Notice: Subject to any disclaimer, the term of this patent is extended or adjusted under 35 U.S.C. 154(b) by 29 days.

(21) Appl. No.: 17/522,926

(22) Filed: Nov. 10, 2021

(65) Prior Publication Data
US 2022/0390231 A1     Dec. 8, 2022

(30) Foreign Application Priority Data

Jun. 2, 2021    (CN) .......................... 202110611900.X

(51) Int. Cl.
    *G01C 13/00*      (2006.01)
    *F03B 13/18*      (2006.01)
    *G01L 1/02*       (2006.01)

(52) U.S. Cl.
    CPC ........ *G01C 13/004* (2013.01); *F03B 13/1865* (2013.01); *G01L 1/02* (2013.01)

(58) Field of Classification Search
    CPC ..... G01C 13/004; F03B 13/1865; G01L 1/02; Y02E 10/30; G01M 10/00
    USPC ...................................................... 73/170.31
    See application file for complete search history.

(56) References Cited

U.S. PATENT DOCUMENTS 4,000,646 A   *   1/1977    Mott ....................... B63B 39/14
                                                       73/170.31

FOREIGN PATENT DOCUMENTS

CN       110375958 A    *   10/2019
CN       209741790 U    *   12/2019
TW       201241276 A    *   10/2012

OTHER PUBLICATIONS

English translation for CN 209741790 U (Year: 2019).*
English translation for CN-110375958-A (Year: 2019).*
English translation for TW 201241276 A (Year: 2012).*

* cited by examiner

*Primary Examiner* — Lee E Rodak
*Assistant Examiner* — Byung Ro Lee
(74) *Attorney, Agent, or Firm* — WPAT, PC

(57) ABSTRACT

A measuring device for wave energy conversion performance of a comb-typed permeable breakwater with arcuate walls is provided. The measuring device includes four parts: the comb-type permeable breakwater with arcuate walls, a wave height measuring instrument and pressure sensor fixing and adjusting apparatus, a wave height measuring instrument data collecting and processing apparatus and a pressure sensor data collecting and processing apparatus. The comb-typed permeable breakwater includes combined arc-shaped caissons, partition plates, a back plate, a fixing bottom plate and fixing screws. The wave height measuring instrument data collecting and processing apparatus processes data collected by a wave height measuring instrument and outputs for display. The pressure sensor data collecting and processing apparatus analyzes data collected by a pressure sensor and outputs for display. The measuring device has a stable structure, convenient operation and high experimental accuracy.

3 Claims, 2 Drawing Sheets

MEASURING DEVICE FOR WAVE ENERGY CONVERSION PERFORMANCE OF COMB-TYPED PERMEABLE BREAKWATER WITH ARCUATE WALLS

TECHNICAL FIELD

The invention relates to the technical field of structural hydrodynamic experimental devices, in particular to a device for measuring wave energy conversion performance of a comb-typed permeable breakwater with arcuate walls. This device can make use of its own structural characteristics to make waves flood into its interior through a water inlet and compress air inside; then the compressed air is ejected through an upper air outlet to form airflow and generate power; a pressure sensor is used to collect data, and a wave height measuring instrument is used to monitor a water level change in the comb-typed permeable breakwater with arcuate walls.

BACKGROUND

At present, resources are an important and necessary condition to ensure the quality of life and strategic development, while non-renewable energy still plays a dominating role. In recent years, due to the growing world population, the rapid development of world economy and the continuous progress of society, energy demands of humans are increasing rapidly. The shortage of fossil energy and the aggravation of pollution force countries all over the world to seek and develop alternative clean and renewable new energy. Oceans cover more than 70% of the earth's surface and are considered as one of the largest renewable energy reserves. The wave energy generated by airflow on the sea is more important and more widely distributed, and it is the largest undeveloped renewable energy in the world. Therefore the development and use of wave energy has gradually become the focus of research. However, the traditional breakwater easily causes sediment deposition and water pollution, which cannot meet the needs of modern green port construction. At present, the existing measuring instruments have some disadvantages, such as mismatched installation, high costs, and considerable external interference.

SUMMARY

An objective of the invention is to provide a measuring device for wave energy conversion performance of a comb-typed permeable breakwater with arcuate walls.

According to a technical scheme provided by the invention, a measuring device for wave energy conversion performance of a comb-typed permeable breakwater with arcuate walls is characterized by comprising four parts, namely, the comb-typed permeable breakwater with arcuate walls, a wave height measuring instrument and pressure sensor fixing and adjusting apparatus, a wave height measuring instrument data collecting and processing apparatus, and a pressure sensor data collecting and processing apparatus.

The comb-typed permeable breakwater with the arcuate wall includes combined upright arc-shaped caissons, partition plates, L-shaped connecting plates, a back plate, and a fixing bottom plate. A water inlet is reserved at a bottom of one of the upright arc-shaped caissons located in a middle position, and an air outlet is reserved at a top of the one of the upright arc-shaped caissons located in the middle position. The back plate is fixedly connected to upper parts of the upright arc-shaped caissons. The partition plates are fixedly connected to middle parts of the upright arc-shaped caissons, and end parts of the partition plates are connected to a lower end of the back plate. The L-shaped connecting plate is fixedly connected to the fixing bottom plate.

The wave height measuring instrument and the pressure sensor fixing and adjusting apparatus exemplarily are composed of leveling screws, a bracket, a large sleeve rod, a sleeve, horizontal control screws, a bidirectional sleeve, a vertical control screw, a small sleeve rod, a wave height measuring instrument, a pipe clamp, a U-shaped chuck and a pressure sensor. The bracket stands across top ends of two walls of a water tank, and is a stand structure formed by welding a plurality of horizontal transverse rods, a plurality of horizontal longitudinal rods and a plurality of vertical rods. The leveling screws are arranged on the horizontal transverse rods to horizontally adjust the bracket. The sleeve is sleeved on an upper one of the horizontal longitudinal rods, and the bidirectional sleeve is horizontally sleeved on a lower one of the horizontal longitudinal rods. A top end of the large sleeve rod is fixedly connected below the sleeve, an upper end of the small sleeve rod is internally sleeved in the large sleeve rod, and a lower end of the small sleeve rod passes through the bidirectional sleeve in a vertical direction. The large sleeve rod is movable transversely in a horizontal direction, and the small sleeve rod is telescopic vertically along the large sleeve rod. The horizontal control screws are respectively arranged on the sleeve and the bidirectional sleeve, and horizontal positions of the large sleeve rod and the small sleeve rod are adjustable through tightness of the horizontal control screws. The vertical control screw is arranged on the bidirectional sleeve to adjust and fix the longitudinal position of the small sleeve rod. The pipe clamp is fixedly connected with a side surface of a lower end of the small sleeve rod. The wave height measuring instrument is installed in the pipe clamp, and the wave height measuring instrument is fixed by tightness adjustment of the pipe clamp. The U-shaped chuck is fixedly connected to a side surface of the lower end of the small sleeve for installing the pressure sensor.

The wave height measuring instrument data collecting and processing apparatus is placed on a control manipulation platform outside the water tank, and is connected with the wave height measuring instrument through a data cable and configured (i.e., structured and arranged) to acquire data from the wave height measuring instrument, process the acquired data and output for display.

The pressure sensor data collecting and processing apparatus is placed on a control manipulation platform outside the water tank, and is connected with the pressure sensor through a data cable and configured to acquire data from the pressure sensor, process the acquired data from the pressure sensor and output for display.

In an embodiment, the leveling screws are installed in reserved threaded holes of the horizontal transverse rods of the bracket to horizontally adjust the bracket, and the levelness of the bracket is adjustable by controlling lengths of the leveling screws.

In an embodiment, the back plate is connected with the upright arc-shaped caissons to form a structural form in which the upper part is connected and the lower part is hollow; the partition plates each are a plate-shaped sheet, which are connected with the upright arc-shaped caissons horizontally, and the end parts of the partition plates are connected with the lower end of the back plate, which integrates the three parts.

The invention may have the following beneficial effects.

1. While carrying out wave energy conversion and effectively utilizing wave energy, it can also protect the water environment and build a green ecological port; 2. in the specific environment of conventional test flume, the lower structure of flume is used to fix the comb-typed permeable breakwater with arcuate walls, which is simple to operate and easy to install, and does not occupy too much space in laboratory; 3. the wave height measuring instrument and the pressure sensor fixing and adjusting apparatus stand across the top of the two walls of the water tank, which are convenient to operate; 4. the wave height measuring instrument and the pressure sensor fixing and adjusting apparatus can control the horizontal and vertical movement of the wave height measuring instrument and the pressure sensor, and can also accurately change their vertical directions and flexibly change the wave height measuring instrument; 5. compared with the traditional comb-typed permeable breakwater, the device of the invention is material-saving, light-weighted and easy to construct, and strong in integrity; each part of the device is separate in operation while works together in function, and can carry out measurement tests of upright comb-typed permeable breakwater with arcuate walls with different scales according to different experimental flume; and 6. each part of the whole device is easy to disassemble and flexible to install, which is very suitable for use in the test flume.

In the figures: 1, comb-typed permeable breakwater with arcuate walls; 11, upright arc-shaped caisson; 12, partition plate; 13, L-shaped connecting plate; 14, back plate; 15, fixing bottom plate; 16, fixing screw; 17, water inlet; 18, air outlet; 2, wave height measuring instrument and pressure sensor fixing and adjusting apparatus; 21, leveling screw; 22, bracket; 221, horizontal transverse rod; 222, vertical rod; 223, horizontal longitudinal rod; 23, large sleeve rod; 24, sleeve; 241, horizontal control screw; 25, bidirectional sleeve; 251, vertical control screw; 26, small sleeve rod; 27, wave height measuring instrument; 28, pipe clamp; 29, U-shaped chuck; 210, pressure sensor; 3, a wave height measuring instrument data collecting and processing apparatus; 4, a pressure sensor data collecting and processing apparatus.

DETAILED DESCRIPTION OF EMBODIMENTS

In order to further illustrate the contents, characteristics and functions of the invention, the detailed description is as follows with reference to the attached drawings.

Figure 1:
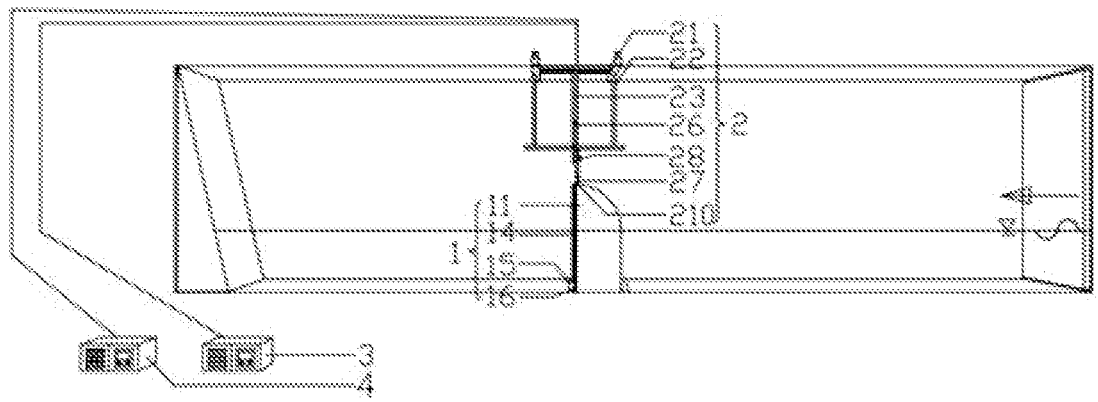
FIG. 1 is a schematic structural diagram of the whole device of the invention.
Figure 2:
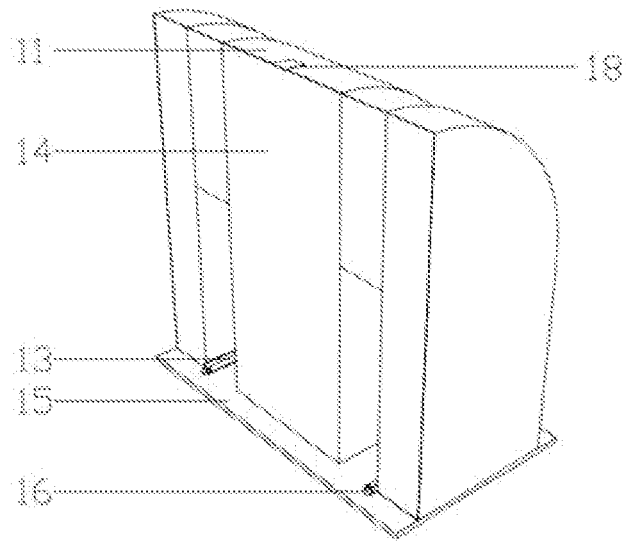
FIG. 2 is a schematic rear view of the structure of the comb-typed permeable breakwater with arcuate walls of the invention.
Figure 3:
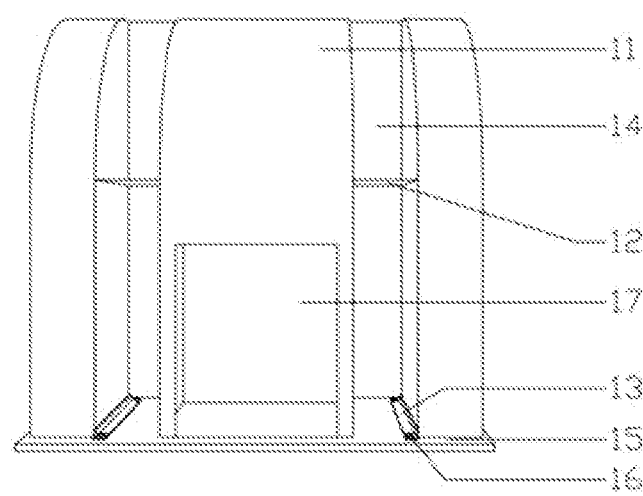
FIG. 3 is a schematic front view of the structure of the comb-typed permeable breakwater with arcuate walls according to the invention.
Figure 4:
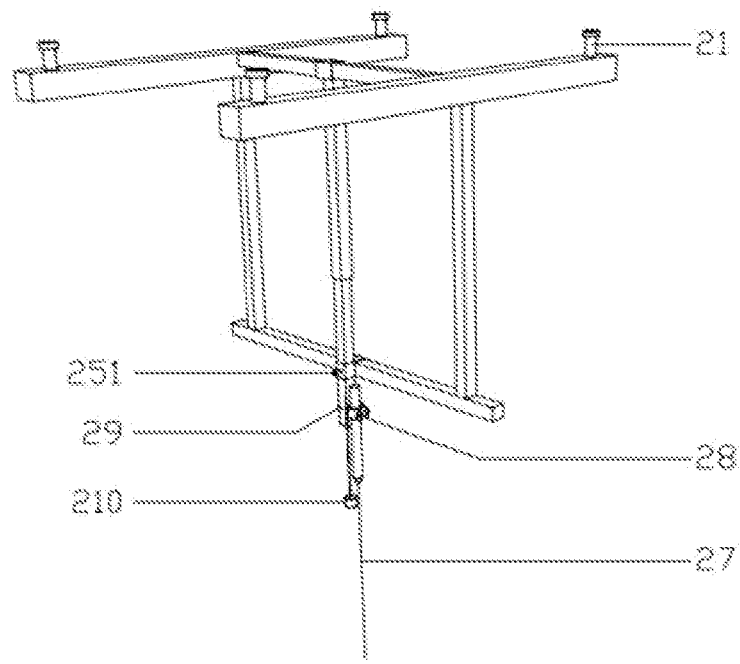
FIG. 4 is a structural schematic diagram of a wave height measuring instrument and pressure sensor fixing and adjusting apparatus according to the invention.
Figure 5:
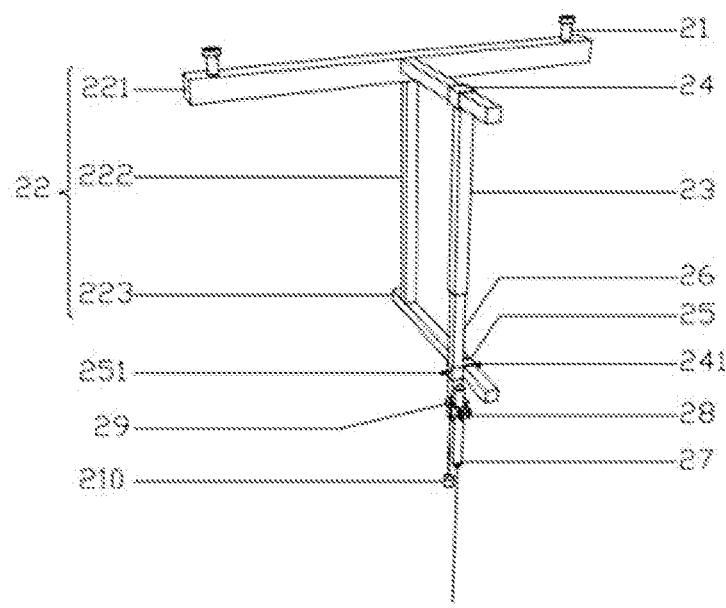
FIG. 5 is a partial structural diagram of the wave height measuring instrument and pressure sensor fixing and adjusting apparatus of the invention.

With reference to FIG. 1, FIG. 2, FIG. 3, FIG. 4 and FIG. 5, a measuring device for wave energy conversion performance of a comb-typed permeable breakwater with arcuate walls mainly is composed of four parts: the comb-typed permeable breakwater 1 with arcuate walls, a wave height measuring instrument and pressure sensor fixing and adjusting apparatus 2, a wave height measuring instrument data collecting and processing apparatus 3, and a pressure sensor data collecting and processing apparatus 4.

Combined upright arc-shaped caissons 11, partition plates 12, L-shaped connecting plates 13, a back plate 14, a fixing bottom plate 15, fixing screws 16, a water inlet 17 and an air outlet 18 together form the comb-typed permeable breakwater 1 with arcuate walls. There are three upright arc-shaped caissons 11 in total combined together. The top of the middle upright arc-shaped caisson 11 is reserved/formed with an air outlet 18 close to the back plate 14, and the lower part of a wave-facing surface is reserved/formed with an water inlet 17 with a certain size. The other two upright arc-shaped caissons 11 are arranged at both sides of the middle upright arc-shaped caisson according to a certain distance and in closed states, and a width of each of the other two upright arc-shaped caissons 11 is half of that of the middle upright arc-shaped caisson 11. The back plate 14 is only connected to upper parts of the upright arc-shaped caissons 11 in the vertical direction, thereby forming a structural form that the upper part is connected and the lower part is hollow. The partition plates 12 each are a thin plate (i.e., plate-shaped sheet), which are mainly horizontally connected with the upright arc-shaped caisson 11 from the middle, and ends of the partition plates 12 are connected with the lower end of the back plate 14, so that the three parts are integrated together. The L-shaped connecting plates 13 are fixed to the fixing base/bottom plate 15 for device connection. Half surfaces of the L-shaped connecting plates 13 are fixedly connected to the bottoms of two sided upright arc-shaped caissons, and bolt holes are reserved on the other half surfaces. Screw holes are respectively reserved at both ends of the fixing bottom plate 15, which are fixed with a bottom plate of the water tank, and fixing screws 16 are fixed in screw holes of the fixing bottom plate 15 through the holes reserved in the L-shaped connecting plates 13.

The wave height measuring instrument and pressure sensor fixing and adjusting apparatus 2 includes leveling screws 21, a bracket 22, a large sleeve rod 23, a sleeve 24, horizontal control screws 241, a bidirectional sleeve 25, a vertical control screw 251, a small sleeve rod 26, a wave height measuring instrument 27, a pipe clamp 28, a U-shaped chuck 29, and a pressure sensor 210. The bracket 22 is an erecting structure welded with two horizontal transverse rods 221, two horizontal longitudinal rods 223 and two vertical rods 222. The two horizontal transverse rods 221 each are provided with threaded holes at both ends, and the bracket 22 stands across tops of two walls of a water tank. There are four leveling screws 21, which are respectively installed in the reserved threaded holes of the horizontal transverse rods 221, so that the bracket 22 can be horizontally adjusted, and the levelness of the bracket 21 can be adjusted by controlling lengths of the leveling screws 21. The sleeve 24 is sleeved on the upper horizontal longitudinal rod 223, and the bidirectional sleeve 25 is horizontally sleeved on the lower horizontal longitudinal rod 223. The upper end of the large sleeve rod 23 is welded to the lower surface of the sleeve 24, and the lower part of the small sleeve rod 26 passes through the bidirectional sleeve 25 vertically, so that the large sleeve rod 23 can move transversely in the horizontal direction. The small sleeve rod 26 is internally sleeved in the large sleeve rod 23 and can be vertically telescopic. The horizontal control screws 241 are respectively installed on the sleeve 24 and the bidirectional sleeve 25, and the horizontal positions of the large sleeve rod 23 and the small sleeve rod 26 are adjusted by adjusting the tightness of the horizontal control screws 241. The vertical control screw 251 is installed on the bidirectional sleeve 25 to adjust and fix the longitudinal position of the small sleeve rod 26. The pipe clamp 28 is welded to a side surface of the lower end of the small sleeve rod 26, and the wave height measuring instrument 27 is installed in the pipe clamp 28, and the wave height measuring instrument 27 is fixed by tightness adjustment of the pipe clamp 28. The U-shaped chuck 29 is welded to a side surface of the lower end of the small sleeve rod 26 for fixedly mounting the pressure sensor 210.

The wave height measuring instrument data collecting and processing apparatus 3 is placed on a control manipulation platform outside the water tank, and is connected with the height measuring instrument 27 through a data cable to acquire data from the wave height measuring instrument 27, process the acquired data and output for display. For example, the wave height measuring instrument data collecting and processing apparatus 3 may be a computer system such as a personal computer.

The pressure sensor data collecting and processing apparatus 4 is placed on a control manipulation platform outside the water tank, and is connected with the pressure sensor 210 through a data cable to acquire data from the pressure sensor 210, process the acquired data from the pressure sensor 210 and output for display. For example, the pressure sensor data collecting and processing apparatus 4 may be a computer system such as a personal computer.

The invention relates to a measuring device for wave energy conversion performance of a comb-typed permeable breakwater with arcuate walls. When in use, the upright comb-typed permeable breakwater with arcuate walls is assembled according to the design and adjusted to the position required by a test/experiment, a wave height measuring instrument and a pressure sensor are placed at required positions according to test requirements, and the horizontal distance and vertical height are adjusted to ensure that the test is accurate.

Although the embodiments of the invention have been described above with reference to the drawings, the invention is not limited to the above specific embodiments, which are only illustrative and not restrictive. Under the inspiration of the invention, those of ordinary skill in the art can make more forms without departing from the scope of the purpose of the invention and the protection of the claims, all of which belong to the protection scope of the invention.

What is claimed is:

1. A measuring device for wave energy conversion performance of a comb-typed permeable breakwater with arcuate walls, wherein the measuring device comprises four parts: the comb-typed permeable breakwater (1) with arcuate walls, a wave height measuring instrument and pressure sensor fixing and adjusting apparatus (2), a wave height measuring instrument data collecting and processing apparatus (3), and a pressure sensor data collecting and processing apparatus (4);

wherein the comb-typed permeable breakwater (1) with arcuate walls comprises combined upright arc-shaped caissons (11), partition plates (12), L-shaped connecting plates (13), a back plate (14) and a fixing bottom plate (15); a water inlet (17) is formed at a bottom of one of the upright arc-shaped caissons (11) located in a middle position, and an air outlet (18) is formed at a top of the one of the upright arc-shaped caissons (11) located in the middle position; the back plate (14) is fixedly connected to upper parts of the upright arc-shaped caissons (11), the partition plates (12) are fixedly connected to middle parts of the upright arc-shaped caissons (11), and end parts of the partition plates (12) are connected to a lower end of the back plate (14); and the L-shaped connecting plates (13) are fixedly connected to the fixing bottom plate (15);

wherein the wave height measuring instrument and pressure sensor fixing and adjusting apparatus (2) comprises leveling screws (21), a bracket (22), a large sleeve rod (23), a sleeve (24), horizontal control screws (241), a bidirectional sleeve (25), a vertical control screw (251), a small sleeve rod (26), a wave height measuring instrument (27), a pipe clamp (28), a U-shaped chuck (29), and a pressure sensor (210); the bracket (22) stands across top ends of two walls of a water tank, and is a stand structure formed by welding a plurality of horizontal transverse rods (221), a plurality of horizontal longitudinal rods (223) and a plurality of vertical rods (222); the leveling screws (21) are arranged on the horizontal transverse rods (221) to horizontally adjust the bracket (22); the sleeve (24) is sleeved on an upper one of the plurality of horizontal longitudinal rods (223), and the bidirectional sleeve (25) is horizontally sleeved on a lower one of the plurality of horizontal longitudinal rods (223); a top end of the large sleeve rod (23) is fixedly connected below the sleeve (24), an upper end of the small sleeve rod (26) is internally sleeved in the large sleeve rod (23), and a lower end of the small sleeve rod (26) passes through the bidirectional sleeve (25) vertically; the large sleeve rod (23) is movable transversely in a horizontal direction, and the small sleeve rod (26) is telescopic vertically along the large sleeve rod (23); the horizontal control screws (241) are respectively arranged on the sleeve (24) and the bidirectional sleeve (25), and horizontal positions of the large sleeve rod (23) and the small sleeve rod (26) are adjustable through tightness of the horizontal control screws (241); the vertical control screw (251) is installed on the bidirectional sleeve (25) to adjust and fix a longitudinal position of the small sleeve rod (26), the pipe clamp (28) is fixedly connected to a side surface of the lower end of the small sleeve rod (26), the wave height measuring instrument (27) is installed in the pipe clamp (28), and the wave height measuring instrument (27) is fixed by tightness adjustment of the pipe clamp (28); the U-shaped chuck (29) is fixedly connected to a side surface of the lower end of the small sleeve (26) to install the pressure sensor (210);

wherein the wave height measuring instrument data collecting and processing apparatus (3) is placed on a control manipulation platform outside the water tank, and is connected with the wave height measuring instrument (27) through a data cable and configured to acquire data from the wave height measuring instrument (27), process the acquired data and output for display;

wherein the pressure sensor data collecting and processing apparatus (4) is placed on a control manipulation platform outside the water tank, and is connected with the pressure sensor (210) through a data cable and configured to acquire data from the pressure sensor (210), process the acquired data from the pressure sensor (210) and output for display.

2. The measuring device according to claim 1, wherein the leveling screws (21) are installed in reserved threaded holes of the horizontal transverse rods (221) of the bracket (22) to horizontally adjust the bracket (22), and a levelness of the bracket (22) is adjustable by controlling lengths of the leveling screws (21).

3. The measuring device according to claim 1, wherein the back plate (14) is connected with the upright arc-shaped caissons (11) to form a structural form of upper connection and lower permeable; the partition plates (12) are plate-shaped sheets and horizontally connected to the upright arc-shaped caissons (11), and the end parts of the partition plates (12) are connected with the lower end of the back plate (14) so that the three parts being the upright arc-shaped caissons (11), the partition plates (12) and the back plate (14) are connected into a whole.

* * * * *